United States Patent [19]

Auger et al.

[11] Patent Number: 4,733,460

[45] Date of Patent: Mar. 29, 1988

[54] APPLICATOR DEVICE CONSTITUTING A MAGAZINE FOR ARTICLES TO BE APPLIED USING THE DEVICE, ESPECIALLY FOR CABLE MARKERS

[75] Inventors: Jean C. Auger, Le Trait; Jean P. Barrtuso, Buchy; Marc Gosse, Cleres, all of France

[73] Assignee: Legrand, Limoges, France

[21] Appl. No.: 904,048

[22] Filed: Sep. 4, 1986

[30] Foreign Application Priority Data

Sep. 9, 1985 [FR] France ............................... 85 13330

[51] Int. Cl.[4] ............................................ B23Q 7/10

[52] U.S. Cl. ........................................ 29/811; 29/270; 81/177.4; 206/345; 206/526; 221/312 C

[58] Field of Search ................. 29/811, 270; 81/177.4; 206/343, 345, 525, 526; 221/70, 71, 312 C

[56] References Cited

U.S. PATENT DOCUMENTS

| | | | |
|---|---|---|---|
| 670,361 | 3/1901 | Sather | 81/177.4 X |
| 3,009,155 | 11/1961 | Leniz | 81/44 |
| 3,250,308 | 5/1966 | March | 221/199 |
| 3,672,738 | 6/1972 | Buttriss | 29/811 X |
| 4,581,481 | 4/1986 | Moretti | 29/811 X |

FOREIGN PATENT DOCUMENTS

| | | | |
|---|---|---|---|
| 2619535 | 11/1976 | Fed. Rep. of Germany . | |
| 2477305 | 9/1981 | France . | |
| 1425332 | 2/1976 | United Kingdom | 206/343 |

*Primary Examiner*—Howard N. Goldberg
*Assistant Examiner*—Ronald S. Wallace
*Attorney, Agent, or Firm*—Charles E. Brown; Charles A. Brown

[57] ABSTRACT

An applicator device constitutes a magazine for the articles to be applied using the device. It comprises an elongate body adapted to hold and guide the articles. A longitudinal hollow space inside the body open at each end is adapted to receive the articles. There is a hood member at the open end of the body through which the articles leave the body. The device may be used for applying cable markers to a cable or electrical conductor, for example.

32 Claims, 11 Drawing Figures

FIG.1
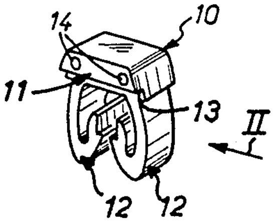
FIG.2
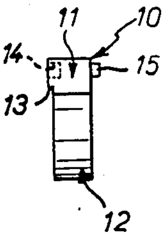
FIG.3
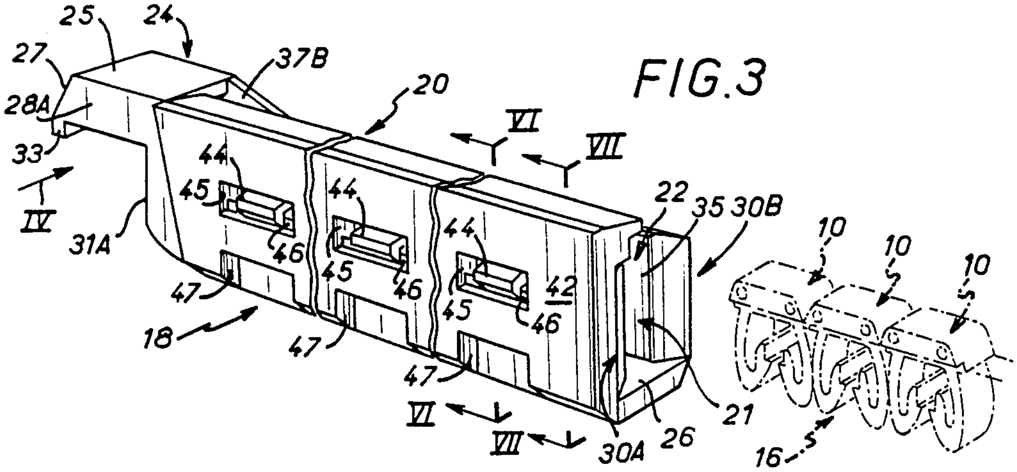
FIG.4
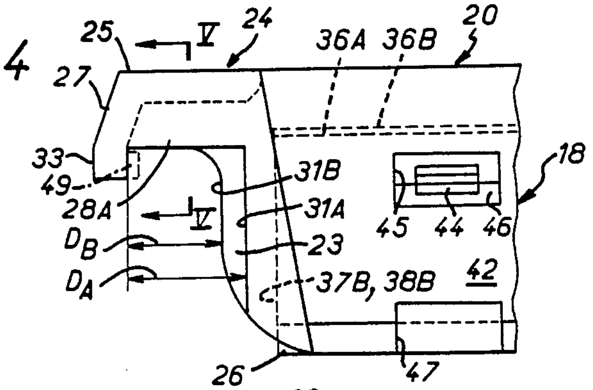
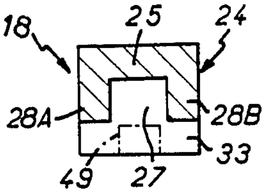
FIG.5
FIG.6
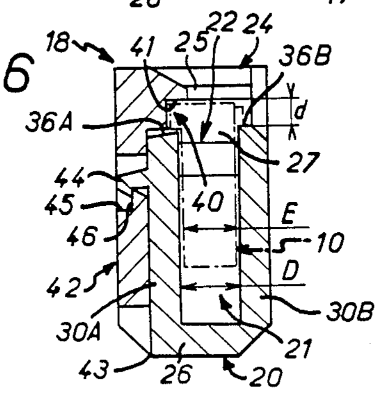
FIG.7
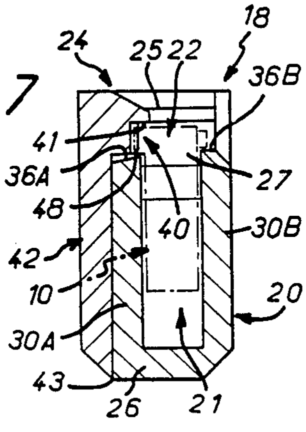

FIG. 8
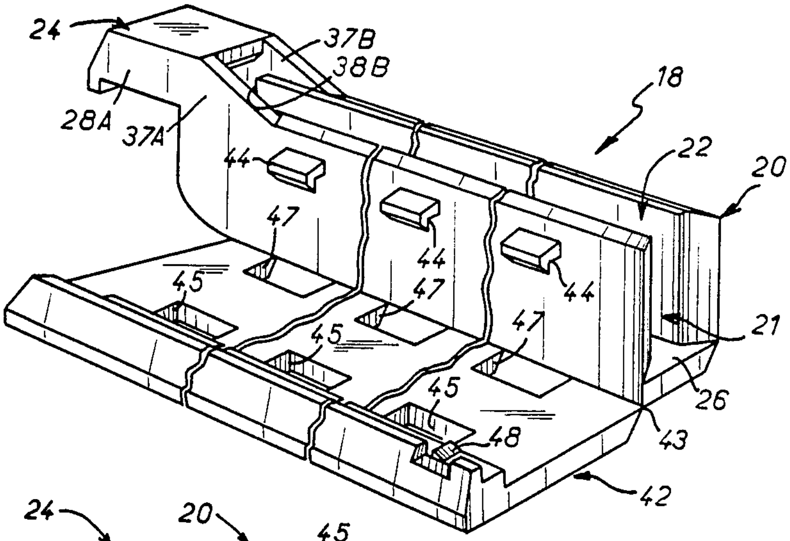
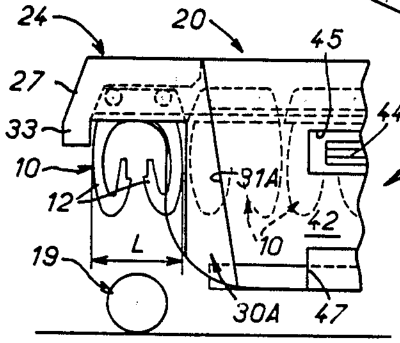
FIG. 9A
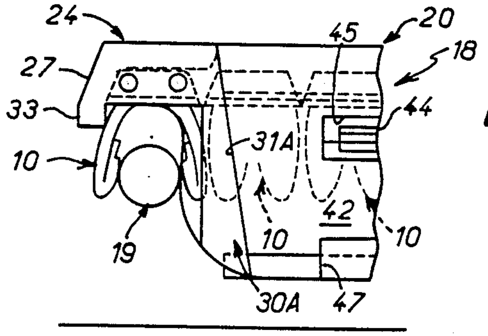
FIG. 9B
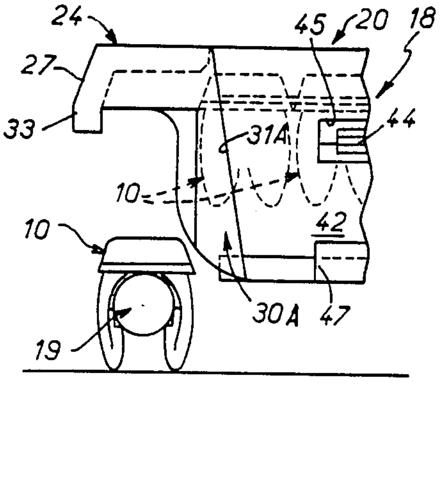
FIG. 9C

APPLICATOR DEVICE CONSTITUTING A MAGAZINE FOR ARTICLES TO BE APPLIED USING THE DEVICE, ESPECIALLY FOR CABLE MARKERS

BACKGROUND OF THE INVENTION

1. Field of the Invention

The present invention is generally concerned with the dispensing and application of articles of any kind.

It is more particularly, but not exclusively, concerned with marker devices for cables which are fitted to cables or other electrical conductors in order to identify them.

2. Description of the Prior Art

They may be, for example, markers of the type described in U.S. patent application Ser. No. 585,376 filed 2 Mar. 1984 now U.S. Pat. No. 4,649,658.

A cable marker device of this kind generally comprises a plate, two elastically deformable arms integral with the plate and forming an open loop by means of which the marker device is adapted to grip a cable, at least one bearing area on that side of the plate adapted to face the cable, and a respective elastically deformable finger on each of the arms, extending inwardly of the open loop and towards the plate and adapted to bear on the cable so as to urge the bearing area towards the cable.

Given that their dimensions are relatively small, reflecting the diameter of the cables to which they are to be fitted, and that this makes them somewhat difficult to handle, markers of this type are preferably fitted to a cable using a tool.

At present this tool is usually a simple applicator device whose only function is to carry out the necessary fitting.

This is the case, for example, with the tool described in the French patent filed 29 Feb. 1980 under the No. 80.04988 and published under the No. 2.477.305.

In this French patent the applicator device concerned, in order to match a specific marker in the form of a closed loop, is in the form of a fork adapted to grasp a marker of this kind laterally and has provision only for temporarily holding the marker in order to take it from a magazine in which it is previously stored and to fix it either alone or in association with other markers into a marker holder provided for this purpose on the cable to be marked.

Thus a tool of this kind is not adapted to form a magazine and one or more markers always have to be fitted to it individually.

Although an arrangement like this normally entails using separate magazines, even if these are merely bags, it entails a relatively large number of complex and time-consuming operations to apply the markers.

As before, the applicator device described in the German patent application No. 26 19 535 concerns a marker in the form of a closed loop.

This tool, which does form a magazine, comprises a longitudinal body of circular cross-section formed by a central core and a blind bush disposed coaxially around said core to which it is attached by its bottom; it further comprises a bar which is mounted to rotate around the core, between the latter and the bush, and which features a plurality of longitudinal grooves appropriately distributed in the circumferential direction and each adapted to hold and guide a string of markers to be applied.

A handle of the type normally fitted to staplers makes it possible to detach these markers one by one in line with a hole in the back of the bush through which the cable or electrical conductor must then be inserted.

The resulting assembly is somewhat complex and therefore costly, utilizing several distinct parts of which some are movable relative to others.

Furthermore, there is no certainty that a marker previously detached from the string of which it formed part will be effectively taken up by the cable or electrical conductor to which it is to be fitted and supposedly inserted into it, and the marker is equally likely to remain jammed inside the tool, in which case it is necessary to demount the tool, which is time consuming.

U.S. Pat. No. 3,250,308 concerns the application of small wide-head nails usually called tacks. The tool described in this patent is a very simple one: it merely comprises a tube with a longitudinal slot cut slantwise at each end.

Although a tool of this kind may be suitable for applying tacks it is clear that it could not be used for other articles, and in particular for markers for cables or electrical conductors.

The same applies to the device described in U.S. Pat. No. 3,009,115 which is more complex, using movable parts and in particular a cover which is distinct from and hinged to the body.

There has been proposed an applicator device for open loop markers for cables or electrical conductors formed by a rod with a longitudinal rib adapted to hold and guide one or more such markers.

An applicator device of this kind, which is incidentally suitable only for the specific markers for which it is intended, entails relatively complex and time-consuming handling operations to transfer the markers that it carries to the cables or electrical conductors to which they are to be fitted.

A general object of the present invention is an applicator device constituting a magazine which, more particularly but not exclusively intended for use with the markers for cables or electrical conductors as described in the previously mentioned U.S. patent application Ser. No. 585,376, is particularly easy to use and has various other advantages.

SUMMARY OF THE INVENTION

The present invention consists in an application device constituting a magazine for the articles to be applied using the device, comprising an elongate body adapted to hold and guide the articles, a longitudinal hollow space inside the body open at each end of the body and adapted to receive the articles, and a hood member at the open end of the body through which the articles leave the body.

The hood member is preferably adapted to form an abutment member, meaning that it is adapted to arrest in a positive way an article to be applied at a longitudinal distance from the outlet from the hollow space inside the body of which it forms an extension.

This makes the fitting of an article more secure.

The hood member is preferably in one piece with and aligned with the body from which it projects cantilever fashion.

This advantageously results in greater simplicity of manufacture, as the entire device may be molded in one piece.

In practise, when they are in the magazine in the applicator device in accordance with the invention the articles concerned are advantageously confined by the device.

This has a two-fold advantage.

Firstly, a surer grasp on the applicator device results, since only the applicator device itself is normally grasped, there being no contact with the articles that it carries.

Secondly, and more importantly, the articles in the magazine in the applicator device are advantageously protected by the device from external aggression.

As one result of this, in a preferred implementation the articles may be in the form of a string, in spite of the relative fragility inherent in any such string due to the need to provide for detaching the articles that constitute it one by one.

The presentation of these articles in the form of a string advantageously facilitates their initial packaging and reloading the applicator device in accordance with the invention.

The hollow space inside the applicator device for the articles to be applied could of course have a closed contour in transverse cross-section to provide complete protection for the articles.

However, in one preferred embodiment the body of the applicator device is laterally open by virtue of a slot extending over at least part of its length, in practise over all of its length, so that its transverse cross-section is generally U-shaped, the hood member then being disposed on the same side of the body as this slot.

An arrangement of this kind advantageously provides access to the articles along all the length of the applicator device, so that they can be easily pushed along the device with the thumb.

This facilitates advancing the articles without significantly degrading the protection needed to maintain the integrity of the string that these articles form.

The article to be applied at the end of a string is presented at the outlet from the hollow space inside the body of the applicator device in accordance with the invention under the hood member and may advantageously be supported at this point, cantilever fashion, only by the next following article to which it is still attached.

This advantageously facilitates fitting it, especially in the case of a cable marker to be fitted to a cable or electrical conductor.

The same applies even if, as a safety feature, some form of projection is provided on the inside of at least one wall of the hood member, to provide further support for the article.

Be this as it may, in line with the hood member, meaning in practise at the outlet from the hollow space inside the applicator device in accordance with the invention, the ends or lips of the longitudinal walls of the body of the applicator device are preferably offset longitudinally relative to each other.

An advantageous result of this is that it makes it possible, once the article to be applied has been fitted to the member to which it is to be applied, to swing the applicator device, which is initially perpendicular to said member, in the direction towards the member which facilitates, by twisting the corresponding coupling, the detaching of the article from that immediately following it.

For enhanced holding and guiding of the articles to be applied, at least one of the longitudinal walls of the body of the applicator device in accordance with the invention may feature an internal shoulder over at least part of its length.

On one of the longitudinal walls this shoulder may form the top edge of the wall.

On the other longitudinal wall it is preferably formed by one flank of a groove, however.

Inserted in a groove in this way, the articles to be applied are advantageously prevented from accidentally escaping transversely from the body of the applicator device in accordance with the invention, although they can slide freely along it.

By providing a detent tooth inside the body, they may also be prevented from escaping from it longitudinally.

This enhances the security of the operations to be carried out.

In practise in one preferred embodiment the other flank of the groove thus employed forms part of a flap distinct from the longitudinal wall concerned and appropriately fastened to it.

By virtue of an arrangement such as this the molding of the applicator device in accordance with the invention, which is in practise made in one piece from a synthetic material, is facilitated as it does not then entail the use of any mold slide to form the groove, and this mold slide would be particularly long and therefore especially fragile.

For example, the flap associated in accordance with the invention with the longitudinal wall concerned may very simply be hinged to the base of this longitudinal wall by virtue of being in one piece with it.

Despite the use of a flap in this way, the applicator device in accordance with the invention still forms a unitary construction assembly, facilitating its manufacture.

After molding, all that is needed is to fold the flap against the associated longitudinal wall of the body and to attach it thereto in some suitable way, snap fastener fashion, for example.

The characteristics and advantages of the invention will emerge from the following description given by way of example only with reference to the accompanying diagramatic drawings.

BRIEF DESCRIPTION OF THE DRAWINGS

FIG. 1 is a perspective view of a marker for cables or electrical conductors for which the applicator device in accordance with the invention is specifically designed.

FIG. 2 is a view of this marker in elevation as seen in the direction of arrow II in FIG. 1.

FIG. 3 is a perspective view of an applicator device in accordance with the invention.

FIG. 4 is a partial view of it in elevation to a larger scale in the direction of the arrow IV in FIG. 3.

FIG. 5 is a view of it in transverse cross-section on the line V—V in FIG. 4.

FIGS. 6 and 7 are further views of it in transverse cross-section, respectively on the lines VI—VI and VII—VII in FIG. 3.

FIG. 8 is a partially cut-away perspective view analogous to that of FIG. 3 showing the molding configuration of the applicator device in accordance with the invention.

FIGS. 9A, 9B and 9C are partial views in elevation analogous to those of FIG. 4 but to a reduced scale showing various phases of applying a marker to a cable or electrical conductor using the applicator device in accordance with the invention.

DESCRIPTION OF THE PREFERRED EMBODIMENT

FIGS. 1 and 2 show a cable marker 10 of the type which is the subject matter of the previously mentioned U.S. patent application Ser. No. 585,376.

The applicator device constituting a magazine in accordance with the invention is specifically designed for markers of this type.

As the marker 10 does not of itself constitute part of the present invention it will not be described in detail here, however.

It is sufficient to mention that it comprises a plate 11 whose plane upper surface is adapted to receive, as by printing, for example, any form of identification element such as a digit, symbol or otherwise, and two elastically deformable arms 12 adapted to grasp the cable or electrical conductor to which the marker is to be fitted.

In the transverse direction (FIG. 2) the plate 11 is flush with the arms 12 over all of its height, on a first side of the arms 12, whereas on the other side, featuring a shoulder 13, it projects slightly beyond the arms 12 over a portion of its height spaced therefrom.

On the part of the plate 11 projecting in this way are formed two blind holes 14 at a distance from each other and on the other side the plate 11 has two complementary projecting pegs 15 in corresponding relationship to these holes 14.

Markers 10 aligned in series on the same cable or electrical conductor may thus advantageously be fastened together, if desired, by inserting the pegs 15 on each of them into the holes 14 of the immediately adjacent marker.

In elevation the plate 11 projects laterally to either side of the elastic arms 12.

As schematically represented in chain-dotted line in FIG. 3 it is thus possible to form such markers 10 as a string 16, each of the markers 10 in a string 16 of this kind being attached by a tear-off skin to the immediately adjacent marker 10 along the corresponding lower transverse edge of the plate 11.

In a string 16 of this kind the markers 10 are aligned with each other, not as extensions to each other, as previously, but disposed side by side relative to each other.

In practise a string 16 of markers 10 thus made up of markers 10 disposed side by side is manufactured by molding, to be more precise by molding any appropriate synthetic material.

As shown in FIGS. 3 through 9, the tool 18 utilized in accordance with the invention for fitting one or more markers 10 to a cable or electrical conductor 19 comprises an elongate body 20 in the shape of a substantially parallelepipedal configuration rod adapted to hold and guide such markers 10.

In practise the body 20 is hollow.

It features an internal, longitudinal hollow space 21 which is adapted to receive the markers 10 concerned and which discharges to the outside at each end.

In the embodiment shown the body 20 of the tool 18 is open laterally by virtue of a slot 22 over at least part of its length, so that the body 20 has a substantially U-shaped transverse cross-section in the corresponding part of its length.

In practise, in this embodiment this is the case over all of the length of the body 20.

In accordance with the invention the body 20 is extended by a hood member 24 at the outlet end of its internal hollow space 21.

In practise the hood member 24, which is on the same side of the body 20 as the slot 22, also has a U-shaped transverse cross-section the concave side of which faces in the opposite direction to that of the U-shaped transverse cross-section of the body 20.

Its center part 25, forming a roof section, is thus disposed opposite the center part 26 of the body 20, forming a baseplate, although it is generally parallel to it.

At the end opposite the body 20 the hood member 24 has a transverse end wall 27 which, in the embodiment shown, extends beyond its longitudinal walls 28A, 28B in the form of a projecting part 23.

As will emerge hereinafter, it is in this way adapted to form an abutment member.

In practise the resulting hood member, which projects cantilever fashion, is in one piece with the body 20 of which it forms an extension.

Either side of its center part 26 the body 20, which in practise forms the main part of the tool 18 in accordance with the invention, itself comprises two longitudinal walls 30A, 30B.

The outside surfaces of these longitudinal walls 30A, 30B are respectively aligned with the longitudinal walls 28A, 28B of the hood member 24.

However, for reasons which will emerge hereinafter the longitudinal walls 30A, 30B of the body 20 are thicker than the longitudinal walls 28A, 28B of the hood member 24, with the result that their inside surfaces project relative to the inside surfaces of the last-mentioned walls.

On the same side as the center wall 25 of the hood member 24, its longitudinal walls 28A, 28B merge with those 30A, 30B of the body 20 through triangular extensions 37A, 37B in the embodiment shown and these triangular extensions 37A, 37B having the same thickness as said longitudinal walls 28A, 28B, with their inside and outside surfaces respectively aligned with those of the latter, the inside surfaces of the longitudinal walls 30A, 30B also project relative to the inside surfaces of said triangular extensions 37A, 37B.

In practise the distance D between the longitudinal walls 30A, 30B of the body 20, as measured between their inside surfaces, is substantially equal to the thickness E of the arms 12 on the markers 10, being slightly greater than the thickness E.

At the outlet 23 from the hollow space 21 inside the body 20, that is to say at the point where this merges with the hood member 24 which follows on from it, the transverse ends or lips 31A, 31B of the longitudinal walls 30A, 30B of the body 20 are offset longitudinally relative to each other.

For example, and as shown here, the transverse end 31A of the longitudinal wall 30A is set back relative to the transverse end 31B of the longitudinal wall 30B.

As measured relative to the projecting part 33 of the end wall 27 of the hood member 24, the transverse end 31A of the longitudinal wall 30A of the body 20 is at a distance $D_A$ from this end wall 27 substantially equal to the overall width L of the arms 20 on a marker 10, being slightly greater than this width L, whereas the transverse end 31B of the associated longitudinal wall 30B is at a distance $D_B$ from this end transverse wall 27 less than said overall width L.

Over at least part of their length the transverse ends 31A, 31B of the longitudinal walls 30A, 30B of the body 20 form right-angle edges substantially perpendicular to the center part 26 of the body 20.

In the case of the transverse end 31A of the longitudinal wall 30A this is the case over virtually all of its length, this transverse end 31A merging at right-angles with the corresponding edge of the longitudinal wall 28A of the hood member 24.

For the remainder, and for reasons which will emerge hereinafter, broadly rounded merging fillets are provided at the end of these transverse ends 31A, 31B of the longitudinal walls 30A, 30B of the body 20, at the base thereof, that is to say on the side opposite the hood member 24.

At the opposite outlet 35 from the hollow space 21 inside the body 20, that is to say at the opening of this internal hollow space 21 which forms its outlet opening, the transverse ends of the longitudinal walls 30A, 30B of the body 20 are bevelled to facilitate the insertion of a string 16 of markers 10 into said internal hollow space 21.

At least one of the longitudinal walls 30A, 30B of the body 20 has an internal shoulder 36A, 36B over at least part of its length to hold and guide the markers 10 inside this internal hollow space 21.

In practise, the shoulder 36A, 36B on each of the longitudinal walls 30A, 30B extends continuously over all of the length of the longitudinal wall 30A, 30B, to a point in line with the associated hood member 24.

The shoulders 36A, 36B which the body 20 thus features internally therefore project relative to the inside surface of the triangular extensions 37A, 37B of the longitudinal walls 28A, 28B of the hood member 24 in the embodiment shown in FIG. 8.

The shoulders 36A, 36B are at substantially the same level on the two longitudinal walls 30A, 30B of the body 20.

They are situated at a distance d from the inside surface of the center part 25 of the hood member 24 which is substantially equal to the thickness of the plate 11 of the markers 10, being slightly less than the thickness.

However, this thickness being appreciated on one side of the plate 11 in line with the shoulder 13 thereof and on the other side of the plate 11 at the lower part of the peg 15 which projects from it, the shoulder 36A on the longitudinal wall 30A of the body 20 is slightly set back relative to the shoulder 36A on the longitudinal wall 30B, the markers 10 having to bear on the shoulder 36A on the longitudinal wall 30A through said shoulder 13 of their plate 11 while they must bear through their pegs 15 on the shoulder 36B on the longitudinal wall 30B.

In the case of the longitudinal wall 30B, the shoulder 36B is a right-angle shoulder, that is to say a shoulder which extends substantially perpendicularly to the inside surface of the longitudinal wall 30B, starting from this surface.

In practise it forms the top edge of the longitudinal wall 30B over at least part of its length and over all of this length in the embodiment shown.

It corresponds to only a fraction of the thickness of the longitudinal wall 30B, however, the remaining portion of the corresponding edge of this being bevelled.

In practise the fraction of the thickness of the longitudinal wall 30B to which the shoulder 36B forming the top edge thereof corresponds is that which, as already indicated, is of greater thickness than the corresponding longitudinal wall 28B of the hood member 24 and the triangular extension 37B of this.

Thus in practise it terminates at a right-angle edge 38B (FIGS. 4 and 8) in line with the corresponding transverse edge at the end of the center part 26 of the body 20 and thus, as has already been indicated, substantially in line with the hood member 24.

The longitudinal wall 30A is of similarly increased thickness relative to the corresponding longitudinal wall 28A of the hood member 24 and, like the latter, this extra thickness terminates at a right-angle edge 37B (FIG. 4) in line with the corresponding transverse end of the associated center part 26.

In the case of the longitudinal wall 30A the shoulder 36A is oblique, forming an acute angle with the inside surface of the longitudinal wall 30A in order to reduce friction between it and the plate 11 of the markers 10.

For the purposes of transverse retention of the markers 10 in both directions it forms, in the embodiment shown, one of the flanks of a groove 40 adapted to guide the corresponding edge of the plate 11 of the markers 10.

In the embodiment shown the other flank 41 of this groove 40 forms part of a flap 42 distinct from the longitudinal wall 30A concerned and appropriately fastened to it.

In practise the flap 42 is held against the longitudinal wall 30A with which it is associated in this way.

In the embodiment shown the flap 42 is hinged to the longitudinal wall 30A at its base, by a line of thin material forming a hinge 43, so that the entire device may be made in one piece by molding it from any suitable synthetic material.

In the embodiment shown the flap 42 is fastened to the longitudinal wall 30A with which it is associated by snap fastener means.

To this end the wall has hook members 44 projecting from its outside surface and the flap 42 has corresponding openings 45 adapted to engage with said hooks 44.

In practise these hooks 44 hook over a shoulder 46 of the openings 45 set back relative to the outside surface of the flap 42, so that they lie wholly within the thickness of the flap 42 without projecting beyond it.

In practise the flap 42 also features at its base, in line with the hooks 44, openings 47 adapted to have passed through them the mold slides necessary for forming the hooks 44 during molding.

The openings 47 extend from the line of reduced thickness material 43, locally interrupting it.

Finally, in the embodiment shown there is a detent tooth 48 in the vicinity of the end of the body 20 opposite the hood member 24, projecting into the internal hollow space 21 in the body, adapted to retain the markers 10 in the body 20 longitudinally.

In the embodiment shown this detent tooth 48 projects from the bottom of a groove 40 which is formed conjointly by the longitudinal wall 30A of the body 20 and the flap 42 associated with it (FIGS. 7 and 8).

As schematically represented in chain-dotted line in FIGS. 3 and 6, to use the tool 18 in accordance with the invention it is sufficient to insert into the hollow space 21 inside its body 20, through the inlet opening 35 thereof, a string 16 of markers 10, the plate 11 of the markers 10 bearing as previously stated on the shoulders 36A, 36B provided for this purpose on the longitudinal walls 30A, 30B of the body 20, and to push them along the length of the body with the thumb, by means of the slot 22.

The markers 10 of the string 16 snap past the detent tooth 48 one by one and this, as previously indicated, secures adequate longitudinal retention of the assembly in the body 20, opposing any retrograde movement therein.

In practise a string 16 of markers 10 may be inserted into the tool 18 in accordance with the invention until, as shown in FIG. 9, the most forward marker 10 reaches the hood member 25 forming an extension of the body 20 of the tool 18.

The tool may equally well be only partially filled, however.

Be this as it may, when the tool 18 in accordance with the invention contains markers 10 in this way it forms a magazine for holding these until they are applied.

To apply them the most forward of the markers 10 is first brought into line with the hood member 24, if not already in this position, as is the case when the body 20 is partially filled only.

When a marker 10 is in line with the hood member 24, butted up against the transverse end wall 27 thereof (FIG. 9A), it is held only by the tear-off skin joining it to the immediately following marker 10, although it is still appropriately guided by the longitudinal walls 28A, 28B of the hood member 24.

In the alternative embodiment shown in chain-dotted line in FIGS. 4 and 5, there is provided for purposes of improved retention a projection 49 on the inside surface of one of the walls of the hood member 24, for example on the projecting part 33 of its transverse end wall 27, as shown here, substantially level with the shoulders 36A, 36B on the longitudinal walls 30A, 30B of the body 20, being slightly set back relative thereto.

Be this at it may, as shown in FIG. 9B it is then sufficient to present the tool 18 transversely to the cable or electrical conductor 19, that is to say substantially perpendicularly to it, and to engage the marker 10 in line with the hood member 24 of the tool 18 over the cable or conductor.

As will be readily understood such engagement is facilitated by the broadly rounded connecting fillets at the base of the transverse ends 31A, 31B of the longitudinal walls 30A, 30B of the body of the tool 18, these connecting fillets automatically aligning the marker 10 concerned with the cable or electrical conductor 19 to which it is to be fitted.

When, by virtue of elastic deformation of its arms 12, the marker 10 is engaged over the cable or electrical conductor 19, it is sufficient to swing the tool 18 to detach this marker 10 from the adjacent one by tearing the corresponding skin.

As indicated hereinabove, such a swinging movement towards the cable or electrical conductor 19 is facilitated by the longitudinal offset between the transverse ends 31A, 31B of the longitudinal walls 30A, 30B of the body 20 of the tool 18.

The design will always be such that the force resisting detachment of a marker 10 from a cable or electrical conductor 19 is significantly greater than the resistance to tearing of the skin linking it to the next marker 10, so that it can be detached from the latter without difficulty.

A more complicated reference, meaning a reference entailing the use of a number of markers 10, may be made up in accordance with the invention on the cable or conductor 19 concerned by successively fitting to it the various markers 10 needed.

These may be markers carrying the same identification element, in which the case the same tool 18 is used successively for each of the markers 10 to be applied, or markers carrying different identification elements, in which case separate applicator devices 18 constituting magazines are used in succession, the same tool 18 normally containing only markers 10 all carrying the same identification element as the markers 10 are normally obtained from a string of identical markers 10.

In practise, the applicator device as shown is more suited to a lefthanded person, the slot 22 in the body 20 being transversely wider on the right than on the left.

It goes without saying that for an applicator device more suited to a righthanded person a reversed disposition is preferably employed.

It will be noted that in all cases the applicator device in accordance with the invention is advantageously exempt of any moving parts in service, that is after the flap that it comprises has been applied against the longitudinal wall concerned.

It will also be noted that for simplicity it comprises only one internal hollow space for a single string of markers of the same type.

The present invention is not limited to the embodiment described and shown, but encompasses any variant execution.

Also, its field of application is not limited to cable markers or to the reference type of cable markers which have been specifically described for convenience only.

To the contrary, its field of application may extend equally well to other types of article to be applied, for exammple cable terminations.

There is claimed:

1. Applicator device constituting a magazine for the articles to be applied using the device, said applicator device comprising an elongate body adapted to hold and guide said articles, a longitudinal hollow space inside said body open at each end of said body adapted to receive said articles, and a hood member at the open end of said body through whih said articles leave said body, the ends of the longitudinally walls of said body being longitudinally offset relative to each other at the end of said body from which said articles leave said body.

2. Applicator device constituting a magazine for the articles to be applied using the device, said applicator device comprising an elongate body adapted to hold and guide said articles, a longitudinal hollow space inside said body open end of said body and adapted to receive said articles, and a hood member at the open end of said body through which said articles leave said body, at least one of the longitudinal walls of said body having a shoulder over at least part of the length of its inside surface adapted to hold and guide said articles, said shoulder being continuous over all of the length of said at least one longitudinal wall, extending to a position in line with said hood member, further comprising a projection on the inside surface of at least one wall of said member, said projection being substantially level with said shoulder and slightly set back relative to it.

3. Applicator device constituting a magazine for the articles to be applied using the device, said applicator device comprising an elongate body adapted to hold and guide said articles, a longitudinal hollow space inside said body open at each end of said body and adapted to receive said articles, and a hood member at the open end of said body through which said articles leave said body, at least one of the longitudinal walls of said body having a shoulder over at least part of the length of its inside surface adapted to hold and guide part of the length of its inside surface adapted to hiold and guide said articles, said shoulder forming a top edge of said at least one longitudinal wall over at least part of the length of said wall.

4. Applicator device constituting a magazine for the articles to be applied using the device, said applicator device comprising an elongate body adapted to hold and guide said articles, a longitudinal hollow space inside said body open at each end of said body and adapted to receive said articles, and a hood member at the open end of said body through which said articles leave said body, at least one of the longitudinal walls of said body having a shoulder over at least part of the length of its inside surface adapted to hold and guide said articles, said shoulder being formed by one flank of a groove.

5. Applicator device according to claim 4, further comprising a flap distinct from but fastened to said at least one longitudinal wall and wherein the other flank of said groove is formed by said flap.

6. Applicator device according to claim 5, wherein said flap lies against the associated longitudinal wall.

7. Applicator device according to claim 5, wherein said flap is hinged to said associated longitudinal wall.

8. Applicator device according to claim 7, wherein said flap is hinged to said associated longitudinal wall by virtue of its being in one piece therewith along said bottom edge.

9. Applicator device according to claim 5, wherein said flap is attached snap fastener fashion to the associated longitudinal wall.

10. Applicator device constituting a magazine for the articles to be applied using the device, said applicator device comprising an elongate body adapted to hold and guide said articles, a longitudinal hollow space inside said body open at each end of said body and adapted to receive said article, and a hood member at the open end of said body through which said articles leave said body, at least one of the longitudinal walls of said body having a shoulder over at least part of the length of its inside surface adapted to hold and guide said articles, said shoulder being oblique to the inside surface of said at least one longitudinal wall.

11. Applicator device constituting a magazine for articles to be applied using the device, said applicator device comprising a hollow elongate body having an internal longitudinal space and means for holding and guiding articles inside said internal space, said hollow elongate body being open at each end to define inlet and outlet openings respectively, a hood member disposed at said outlet opening and in one-piece construction with said body, said hood member being aligned with and projecting in cantilever fashion from one side of said body, a longitudinal slot extending over at least part of the length of said one side of said body and communicating with said internal space, said means for holding and guiding the articles including an internal shoulder, said hood member having an undersurface transversely spaced relative to said internal shoulder, said undersurface of said hood member being adapted to bear against a forwardmost article in order to apply the same.

12. Applicator device according to claim 11, wherein said body and said hood member have respective substantially U-shaped cross-sections, the respective U-shaped cross-sections opening in opposite directions.

13. Applicator device according to claim 11, wherein said hood member defines an abutment member to limit longitudinal displacement of the forwardmost article in the hood member.

14. Applicator device according to claim 11, wherein said abutment member comprises a transverse wall relatively longitudinally remote from the outlet opening of said body.

15. Applicator device according to claim 11, further comprising a projection on an inside surface of at least one wall of said hood member for temporarily restraining an article in said hood member.

16. Applicator device according to claim 11, wherein the longitudinal walls of said body at the outlet opening of said body are longitudinally offset relative to each other.

17. Applicator device according to claim 11, further comprising a detent tooth projecting into said internal space in said body, defining means for preventing rearward movement of articles toward said inlet opening.

18. Applicator device according to claim 11, wherein said slot defines means for providing access to the articles in said internal space for displacing the same toward said hood member.

19. Applicator device according to claim 11, wherein the articles are cable markers having depending legs, the depending legs of the forwardmost article being adapted to protrude below said hood member.

20. Applicator device according to claim 19, wherein the articles are adapted to be arranged in the applicator with their legs extending perpendicularly to the longitudinal axis of the body, one next to another.

21. Applicator device according to claim 19, wherein the applicator device is adapted to be twisted about an axis through said hood member perpendicular to the longitudinal axis of the body to release a forwardmost article from said hood member.

22. Applicator device according to claim 11, wherein said internal shoulder extends over at least part of the length of an inside surface of one of the longitudinal walls.

23. Applicator device according to claim 22, wherein said shoulder is oblique to the inside surface of said at least one longitudinal wall.

24. Applicator device according to claim 22, wherein said shoulder is continuous over all of the length of said one longitudinal wall to a position in line with said hood member.

25. Applicator device according to claim 21, further comprising a projection on the surface of at least one wall of said hood member, for temporarily restraining an article in said hood member, wherein said projection is substantially at the level of said shoulder and slightly set back relative thereto.

26. Applicator device according to claim 22, wherein said shoulder forms a top edge of said one longitudinal wall over at least part of the length of said wall.

27. Applicator device according to claim 22, wherein said shoulder is formed by one flank of a longitudinal groove in said one longitudinal wall.

28. Applicator device accsording to claim 27, further comprising a flap distinct from but fastened to said one longitudinal wall and wherein a flank opposite the first mentioned flank of said groove is formed by said flap.

29. Applicator device according to claim 28, wherein said flap is attached snap fastener fashion to said one longitudinal wall.

30. Applicator device according to claim 28, wherein said flap lies against said one longitudinal wall.

31. Applicator device according to claim 28, wherein said flap is hinged to said one longitudinal wall.

32. Applicator device according to claim 31, wherein said flap is in one-piece construction with and hinged to said one longitudinal wall along said bottom edge.

* * * * *